Figure 1:
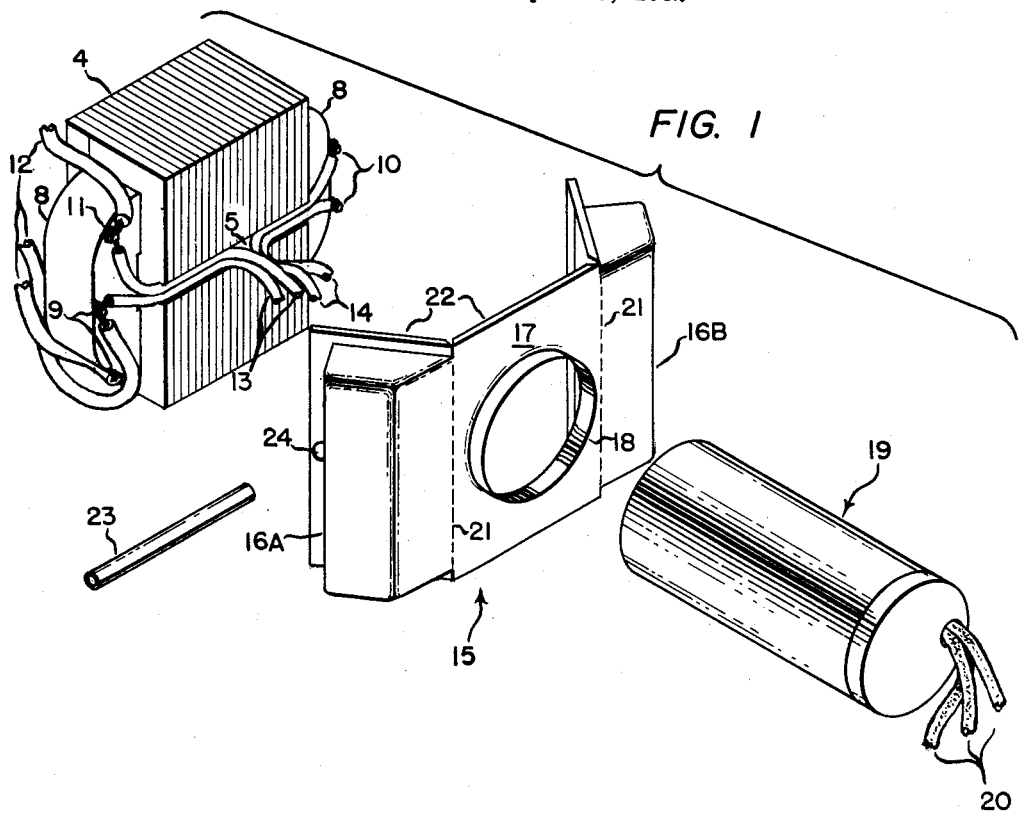

May 26, 1964  W. W. CLEMENTS  3,134,952
COMBINED RELAY AND TRANSFORMER UNIT
Filed Sept. 26, 1962

United States Patent Office 3,134,952
Patented May 26, 1964

3,134,952
COMBINED RELAY AND TRANSFORMER UNIT
Warner W. Clements, Los Angeles, Calif.
(13435 Java Drive, Beverly Hills, Calif.)
Filed Sept. 26, 1962, Ser. No. 226,329
4 Claims. (Cl. 336—105)

My invention is a novel design for a relay with a built-in transformer. The principal application of the device is the remotely-controlled switching of lights, motors, appliances, and other power-line equipment. It is particularly well adapted to be installed as part of the permanent wiring of buildings of all types.

Prior Art and Need for Improvement

Prior art relays designed for the same type of service must each, in actual application, be connected to a transformer. The principal purpose of the transformer is to put a limit on the power available to the control circuitry, and thus permit the control wiring to be done with light-duty wire, usually without benefit of conduit. The most typical installation makes use of a plurality of relays, with only one transformer to provide control power for all. However, the wiring from transformer to relays (which is in addition to the necessary wiring from relays to switches) represents a complication which it is possible to do away with in some instances. By far the simplest and most convenient remote-control power-line switching to install is that in which a transformer is built into each relay. Such a system has particular appeal for do-it-yourselfers and for electricians who do not specialize in remote-control switching and hence do not find it worthwhile to master the complexities of the separate-transformer systems. Moreover, when the cost of labor is taken into account, the built-in-transformer system can even be the more economical to install, despite the fact that its components are more expensive.

Whether or not they incorporate transformers, most relays designed for the indicated application are so built that they can be mounted in electrical junction boxes or outlet boxes. It happens that space within these boxes is usually at a premium. At the very least there must be room for a number of spliced connections of heavy wire; often outlet fittings or studs for lighting fixtures are crammed in as well. Accordingly, relays are usually designed with a cylindrical body that is inserted through a knockout hole (originally provided for the entry of conduit) and extends outward from the box, leaving within the box only that part of the relay which is too large to go through the hole.

In the case of a relay incorporating a transformer, this means that the transformer must necessarily be located in that part of the assembly which remains within the box. (It would not be economically feasible to try to utilize both a transformer small enough to go through a standard knockout hole and a relay sensitive enough to operate on the minuscule power available from such a transformer.) It then becomes a matter of great concern that the transformer, as enclosed, be as small as possible and of a shape to cause the least possible obstruction within the box.

Unfortunately, there are incidental items which must be housed along with the transformer in the relay assembly. These items include the terminals and wiring necessary for the interconnections between the power line, the transformer windings, and the relay proper. While the transformer can be made quite small as transformers go, the wiring adjacent to it cannot be shrunken in size to the same proportion. In other words, the wiring bulks unexpectedly large in comparison with the transformer. Moreover, it tends to occupy an inordinate amount of space within the housing, something like tall wine bottles in a refrigerator.

Another item tending to contribute undue bulk is the transformer-enclosing structure itself. This structure must perform the function of protecting vulnerable parts of the transformer assembly. It must also provide the means for connecting the relay assembly to the transformer assembly, maintaining both in their proper relative alignment. But small transformers are difficult to fasten to. The solution utilized in relevant prior-art devices has been to simply box-in the transformer, without penetrating it in any way with fastening means.

This solution suffers from the fact that any totally-enclosing, box-like structure must consist of something more than six thin walls. Whenever provision is made for assembling such a structure from at least two parts, there is a need to make the parts rigid despite the divisions in the structure. There is also the necessity for incorporating fasteners to join the parts. These requirements will inevitably make the structure bulkier overall than the mechanical ideal. The prior-art devices just mentioned use moulded plastic housings. The necessary rigidity is secured by making the walls rather thick; still more plastic is added in the form of exterior bosses which accommodate sheet-metal fasteners. All this, of course, contributes more bulk than would be desirable.

But any total enclosure, particularly a plastic one, contributes bulk in still another way—it makes necessary special measures to provide for the cooling of the transformer. (In the usual remote-control switching system the relays are energized only briefly, and so a transformer does not have occasion to heat up under normal circumstances. But it is desirable to make provision for unusual circumstances under which energization might be prolonged.) To prevent hot spots from developing, it is desirable to leave air spaces between the transformer and the inner walls of the enclosure. As a result, cubage is once again increased.

To sum up, there is a serious problem involved in trying to make the transformer-assembly portion of a relay-transformer combination small enough, and small enough in the right places, for the requirements of the indicated market. The problem is so serious, in fact, that as of the date of this document no manufacturer has yet produced a relay-transformer combination which has been widely accepted by the trade as meeting its requirements for size and shape.

What the Invention Accomplishes

First and most importantly, the invention brings about a drastic reduction in size, and an improvement in shape, of the transformer assembly, as compared with the prior art.

Secondly, the invention provides for improved cooling of the transformer (which gain may, of course, be traded for a still further reduction in size).

Finally, the invention permits the achievement of small but worthwhile economies in manufacture.

How the Accomplishments Are Secured

A novel arrangement dispenses with any housing over the transformer core on three sides, taking advantage of the fact that the core needs no protection and is best left open to its surroundings for cooling purposes. The core is itself employed as a closure and protection for the near end of the relay. The core is further employed as the rigid structure to which the relay is ultimately fastened. The core is still further employed by finding non-functional space within it into which the wiring can be recessed (thus not only saving space but providing a protecting and directing conduit for said wiring).

As a result of these useful employments of the core, it becomes possible to dispense with the heavy, overall housing used in the prior art and to leave in its place only a thin, vestigial housing of novel design. The new housing is capable of exceptionally simple manufacture and assembly. Housing and core together make an assembly optimally shaped for mounting in small electrical-wiring boxes. As a final contribution from the core, there is provided a recessed space for the fastener which is the sole one required for securing the housing.

*Drawings, Illustrative Embodiment*

FIG. 1 is an isometric view of the complete device in "exploded" arrangement. The housing structure 15 is shown as it would look just prior to assembly, bent open from its final or closed shape. The dashed lines 21 are bending lines and do not indicate any structural feature.

Figure 2:
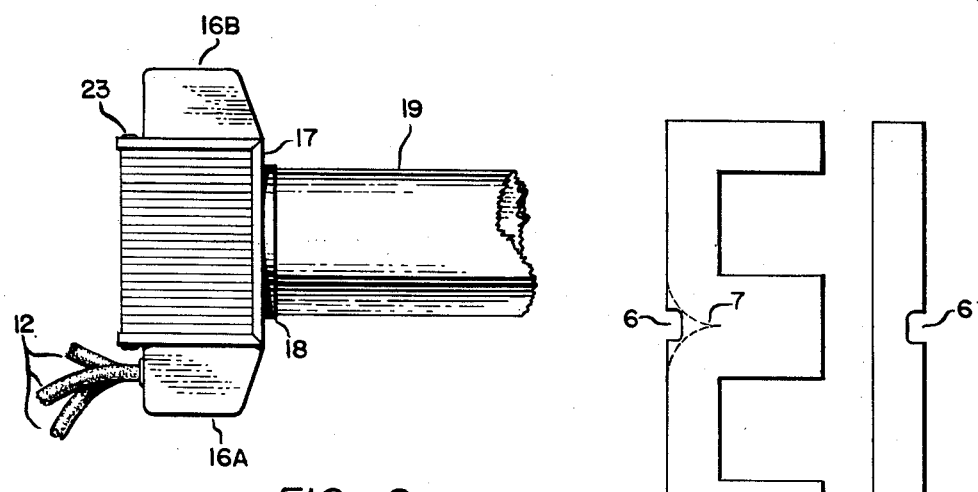

FIG. 2 is a view of the device in assembled condition. With regard to other views, this is a plan view, although there is no preferred position for the device itself. Detail at the right extremity of the device not being relevant, it is shown broken away.

Figure 3:
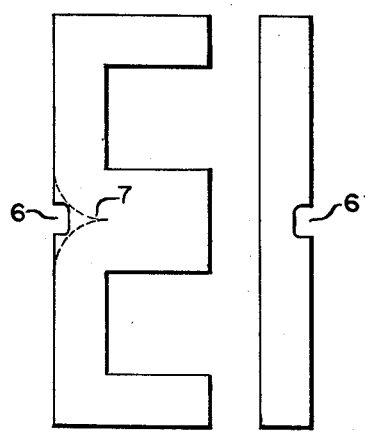

FIG. 3 is a view of the two parts of a single transformer lamina, drawn to a larger scale than the other figures. This view may be taken as an elevation from either side. The dashed lines visible in the figure do not indicate any structural feature; their meaning will be explained below.

*Construction*

The invention requires the use of a "shell-type" core (as opposed to a "core-type" core) in the transformer. In the figures the core 4 is shown to be proportionately shorter in the direction of the coil axis and longer in the other two directions than is usual in transformer design. The unusual proportions, when combined with other features of the embodiment, result in an overall shape for the device as a whole that adapts it for mounting in small and crowded electrical wiring boxes.

The core is built up from stacked laminae, in the usual fashion. Current transformer construction practice provides various schemes for dividing up each individual lamina in order to provide means for installing the coil. Any of these schemes will suffice for purposes of the present invention. The arrangement shown in FIG. 3 happens to be the common "E-I" stamping form.

An important feature of the core, which can be observed in FIG. 1, is channel 5 on an axial face. (The axial faces of a core are here taken to be those two faces which are penetrated by the axis of the transformer coil. Similarly, the axis of a lamina is the centerline of its central leg.) This channel is created by notching each lamina at the appropriate place. It will be noted from FIG. 3 that there are two notches in each lamina, rather than one. That is to say, there is one notch in each of the two pieces that make up a lamina. This is because the position (left or right in the drawing) of pieces of a given type is alternated frequently in the process of stacking. Thus, two notches are necessary in order to provide one channel. A second channel is simultaneously provided as a sort of by-product; the invention makes good use of this second channel, as well.

Note that the notches 6 are positioned at each end of the axis of each lamina. In this position they serve the purposes of the invention while not appreciably interfering with the magnetic flux. The dashed lines 7 are drawn in the figure to indicate the boundaries of a uniform magnetic cross section. In other words, if the notches do not penetrate within the radii indicated, they will not diminish the adjacent cross section below that obtaining elsewhere in the magnetic circuit. The shape of the notches is carefully chosen to provide maximum channel capacity for purposes of the invention, without transgressing the border just mentioned.

In FIG. 1 the protuberant portions 8 of the transformer coil are clearly visible. To these protuberances are mounted, in the usual fashion, a number of solder terminals. Two of these terminals, indicated at 9, are connected internally to the primary of the transformer. Two others, indicated at 10, are connected internally to the secondary of the transformer. Still another terminal, indicated at 11, has no internal transformer connection but serves solely as a tie-point for connecting a wire routed to the exterior of the device to a wire of slightly smaller diameter run through the interior of the device.

External wire leads 12, in accordance with conventional practice, are color coded and left a few inches long in the relay assembly as sold. Their purpose is to provide for the necessary connections to power line and load.

There are four wire leads which must be run internally of the device. Starting from the terminals just mentioned, they are routed around the corner of the core onto its near face, and thence turning again to go into the interior of the relay proper. Two of these leads, indicated at 13, convey the line voltage to and from the line power switch (which switch is a part of the relay and is located in the cylindrical housing shown in the figure). The other two leads, indicated at 14, convey the secondary power from the transformer to the relay motor and associated control wiring.

In a device where space is a critical matter, the diameter of wires 13 and 14 is a measurement to be reckoned with. In comparable prior art devices, where corresponding wires must be similarly routed, the transformer is displaced in order to make room for the wires to get by it. Because the transformer is displaced, the overall housing must be larger than would otherwise be required. Because it is larger it must be more heavily constructed, and hence larger again. As skilled mechanics will appreciate, cubage accumulates fast in a given design and is best nipped in the bud. As a feature of my invention, no space whatsoever is lost by virtue of the wires traversing the core face enroute to the relay proper. Instead, these wires are neatly nestled in channel 5. Since two leads enter the channel from one direction and two enter from the opposite direction, maximum use is made of the available channel capacity.

The housing structure is indicated generally at 15. In the illustrative embodiment it is a single-piece stamping made from thin sheet metal. The single-piece feature is, in general, a highly advantageous one, as it makes the housing economical to produce and assemble. However, if it should happen that the tooling and techniques available to a given manufacturer would make it advisable for him to assemble the housing structure from a plurality of smaller pieces, such a modification would not diminish the other advantages conferred by the invention.

As with manufacturing techniques, so with materials. I highly recommend the use of metal because it economizes on space and it transmits heat well. But if some circumstance which I cannot now forsee would dictate the use of another material, most of the benefits of the invention could still be reaped.

In any event, a general form for the housing structure is definitely contemplated by the invention. It must have two cupped portions, represented in the illustrative embodiment by 16A and 16B, which serve to cover and protect the respective protuberances of the transformer coil. These two portions of the housing also brace the whole assembly by making firm contact with the core adjacent the coil. (Portion 16A has ferruled holes in it to permit the exit of power-line leads 12.) The two cupped portions of the housing must be connected by a yoke portion, represented in the illustrative embodiment by 17. The yoke portion must include means for mounting the relay proper. In the illustrative embodiment this means is a flange 18. (Any comparable means will suffice.) Finally, the housing structure must be so arranged that its assembly to the transformer may be completed by the installation of a single fastener joining the non-yoked extremities of its cup portions.

The relay 19 must have an elongated shape, so that it will fit through a standard knockout hole in an electrical wiring box. Beyond that, the details of the relay are not relevant to the present invention. A suitable relay motor is described in my Patent Number 2,972,091, issued Feb. 14, 1961. A suitable relay switch is described in my copending application Serial Number 242,313, filed Dec. 4, 1962. Whatever relay type is used, some means must be provided for making connections to the low-power control circuitry (and indicator circuitry, if used). Such a means preferably takes the form of stubbed lead wires a few inches long, with appropriate color codes. Such wires are shown (broken short, for convenience in drawing) at 20 in FIG. 1. However, there may in a given instance be more or fewer of these wires than the three shown.

I have found the following sequence for assembly of the major components to be convenient: First, attach empty relay housing to transformer housing structure. Second, insert and secure relay insides. Third, complete electrical connections. Fourth, close housing around transformer and secure.

The relay housing is attached to the transformer housing by means of spot-welding, brazing, cementing, or a tab-and-slot arrangement. As for attaching integrated housing to the transformer, that's simply a matter of inserting the transformer, bending shut the enclosure, and securing it with the lone fastener. The housing, being made of thin sheet metal, will bend readily along lines 21 when pressure is applied. Flanges 22 stiffen the housing and keep it from bending elsewhere.

Fastener 23 is hollow for a short distance in from each of its ends, so that it may be upset like a tubular rivet at both ends. Where housing material is very light, it may be desirable to provide the fastener with shoulders, which shoulders will prevent dimpling of the material during the upsetting process. Hole 24 in housing portion 16A and another corresponding hole in housing portion 16B provide for the insertion of the fastener. When inserted and clinched, the fastener lies in that channel in the core which is not visible in FIG. 1, but which will be found opposite from channel 5 in the actual device.

*Design Variations*

In the effort to best help the reader to practice the invention, I have mentioned as I went along some useful departures from the specific design of the illustrative embodiment. However, it would be impossible to mention all of such possible departures. I do not consider my invention limited to the employment of details specifically described, except as hereinafter claimed.

*Some Needed Definitions*

By the transformer "coil," I mean the transformer winding assembly and all that normally goes with it, e.g., the wrappings of insulating materials.

As my definition of "relay," I adopt the following, quoted from a dictionary: "A device by means of which a change of current or voltage in one circuit can be made to produce a change in the electrical condition of another circuit." I intend the word to embrace the housing, where appropriate, along with the other usual relay parts.

I claim as my invention:

1. A remote-control unit comprising:
   a transformer comprising a coil, and a core which partially encloses said coil while leaving two portions thereof protruding in opposite radial directions, said core being provided with a channel in each axial face;
   housing structure enclosing the two protuberances of the transformer coil, said housing structure including a yoke portion spanning one axial face of the core;
   an elongated relay mounted to the yoke portion of the housing structure in an attitude parallel to the extended axis of the transformer coil;
   and electrical wiring routed at least part way through the channel on the relay side of the core, and routed thence to the interior of the relay.

2. A remote-control unit comprising:
   a transformer of the type in which a laminated shell-type core partially encloses a single coil, leaving two portions of the coil oppositely protruding from the core, said transformer having a channel in each axial face of its core, said channels being disposed centrally of their respective faces and perpendicularly of the laminae;
   housing structure consisting entirely of three portions, two of these being cupped portions each substantially enclosing a respective side of the transformer on which the coil protrudes, the third being a yoke portion connecting said cupped portions by spanning an axial face of the transformer core;
   an elongated relay mounted to the yoke portion of the housing structure in an attitude perpendicular to the adjacent face of the core,
   said yoke portion and the relay together substantially covering the channel in the spanned face of the core;
   fastening means mounted through the channel on the unencumbered core face and connecting the two non-yoked extremities of the cupped portions of the housing structure;
   and electrical wiring routed at least part way through the channel on the relay side of the core, and routed thence to the interior of the relay.

3. The unit of claim 2 further characterized in that the electrical wiring consists of four wires, two of which wires enter the channel from one end, the remaining two of which wires enter the channel from its other end.

4. The unit of claim 3 further characterized in that the housing structure is constituted substantially in its entirety by a single-piece, sheet-metal stamping;
   and still further characterized in that each of the listed three portions of the housing is separately equipped with stiffening flanges.

No references cited.